May 14, 1929.　　　　　F. ENGMAN　　　　　1,713,378
ROTARY ENGINE
Filed Nov. 18, 1926　　　　6 Sheets-Sheet 1
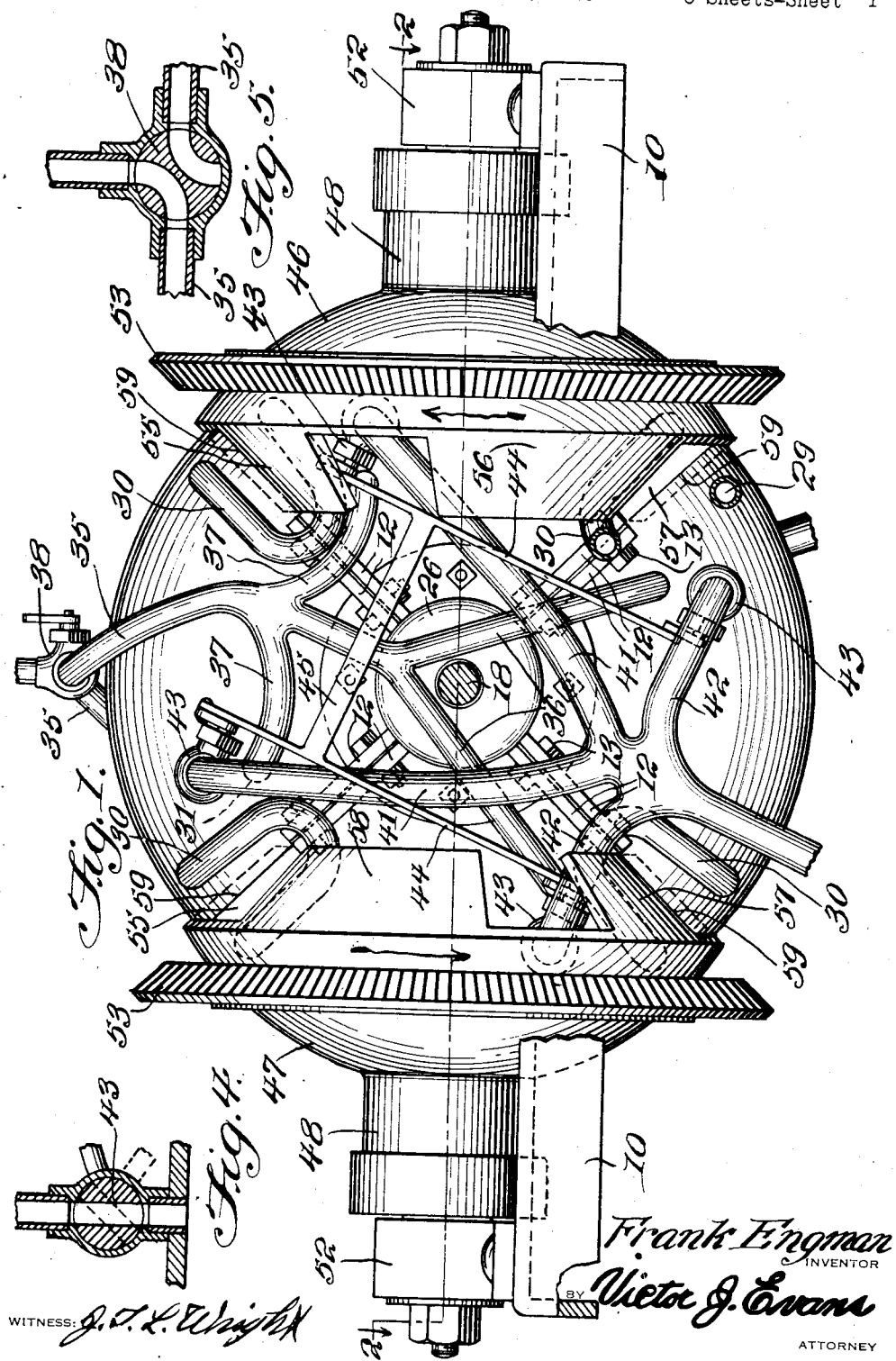

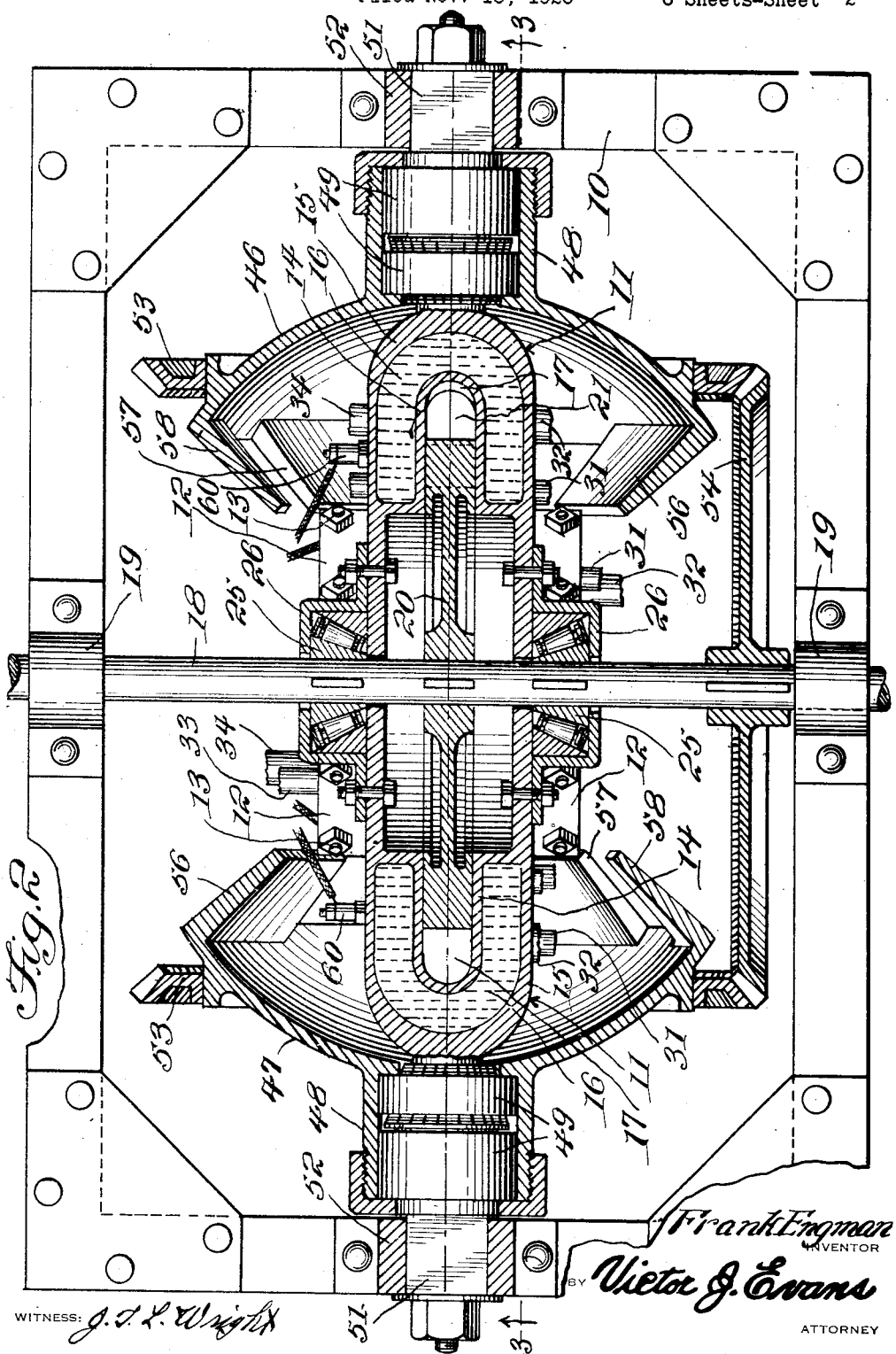

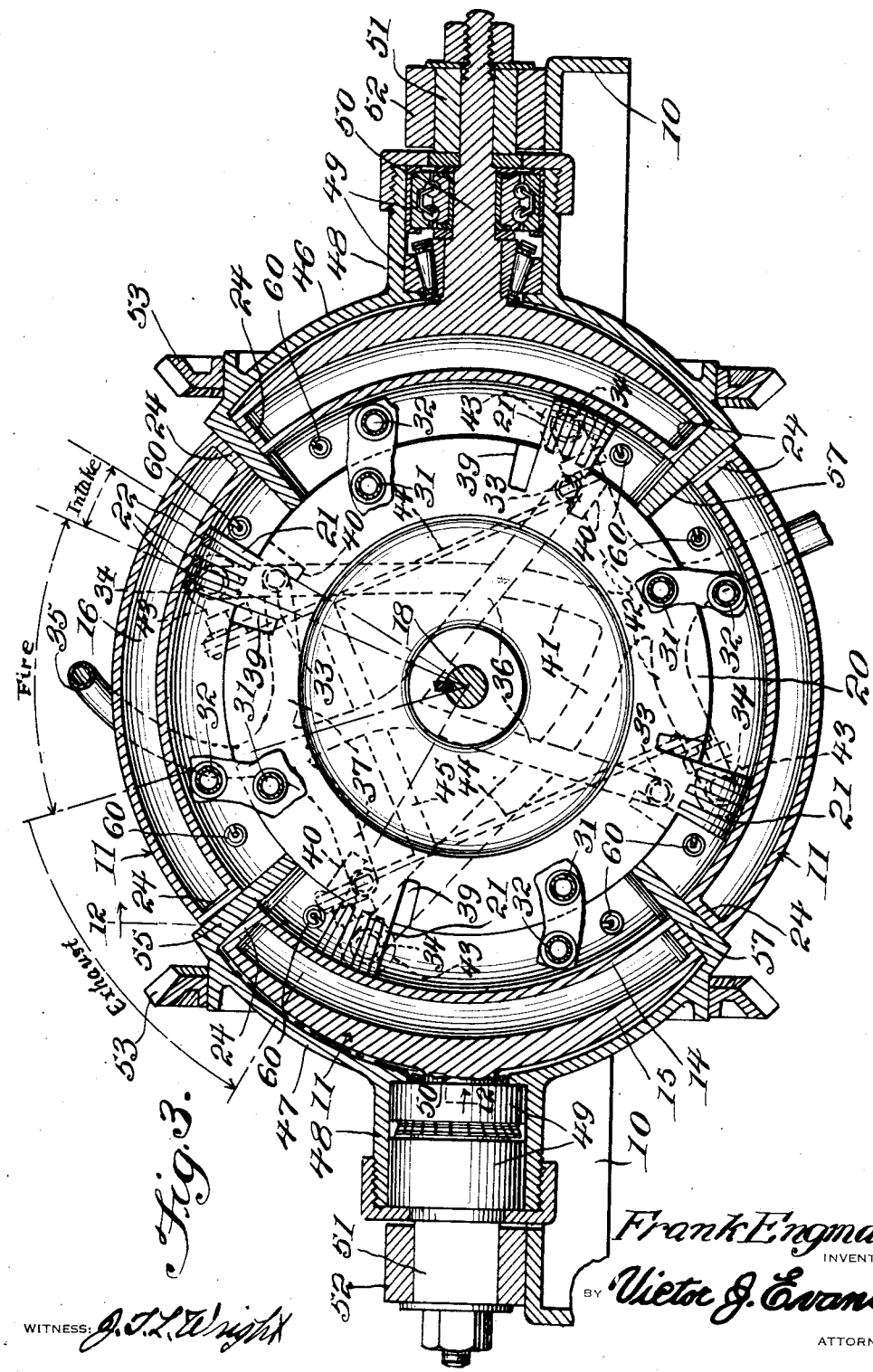

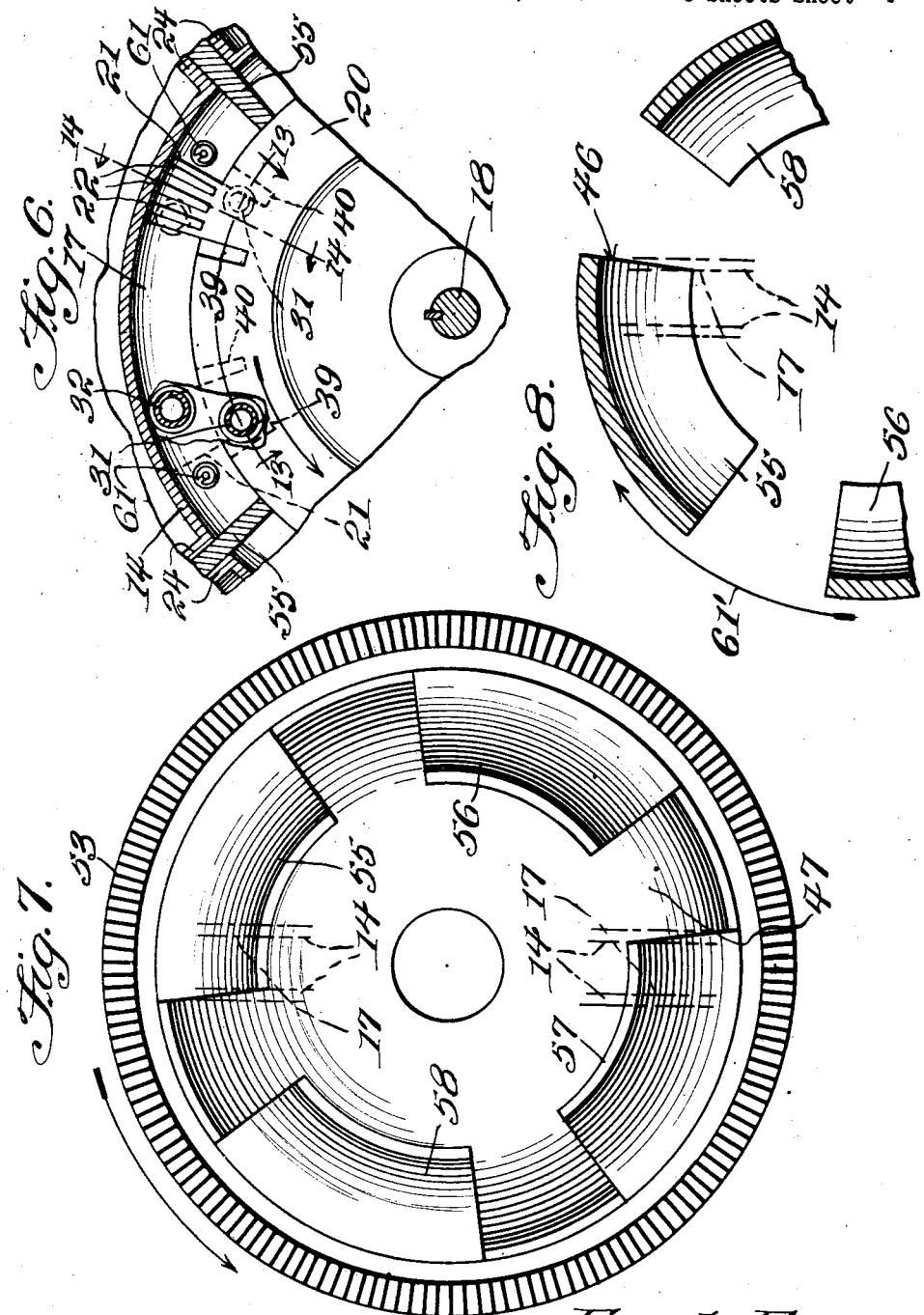

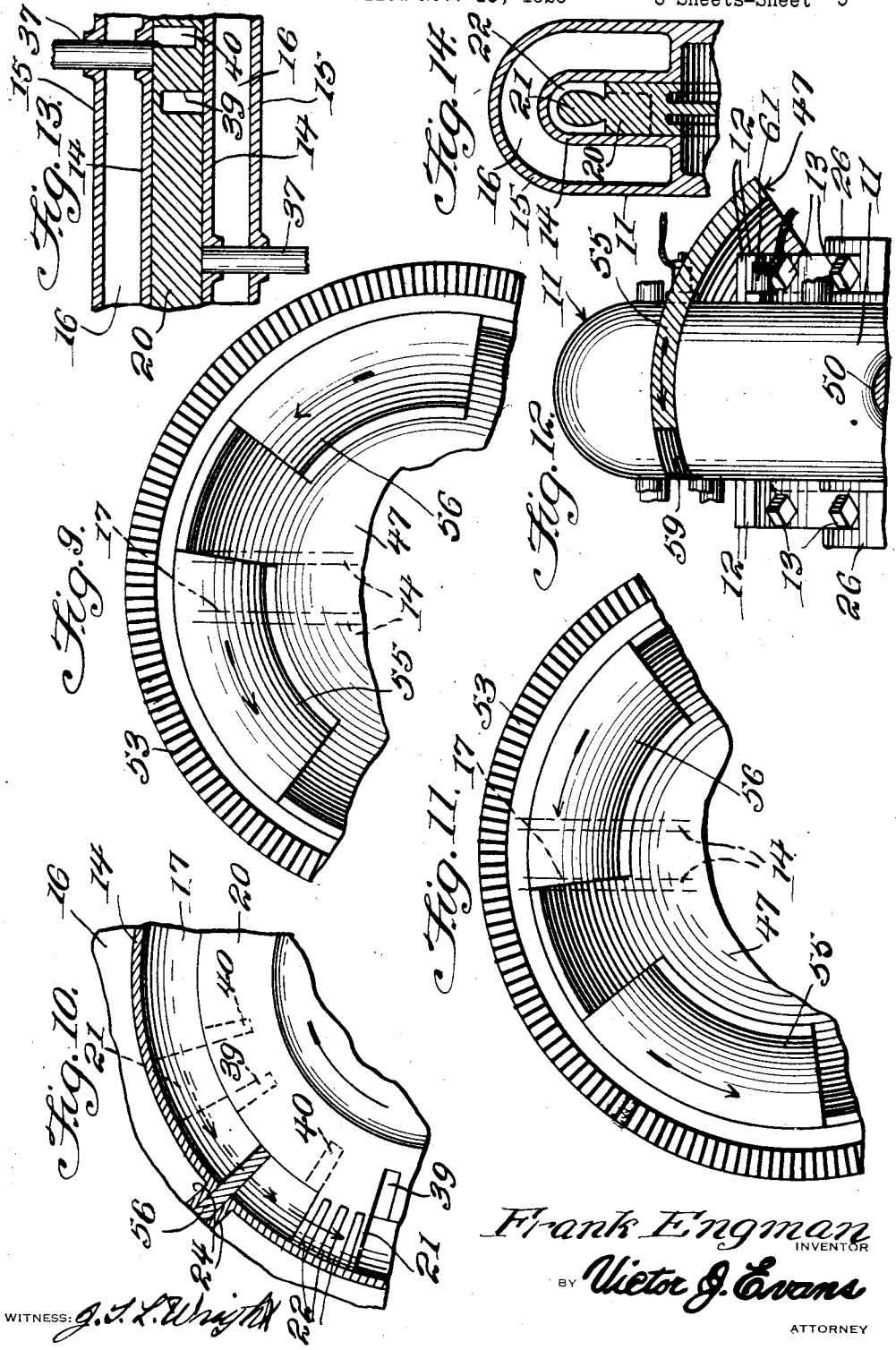

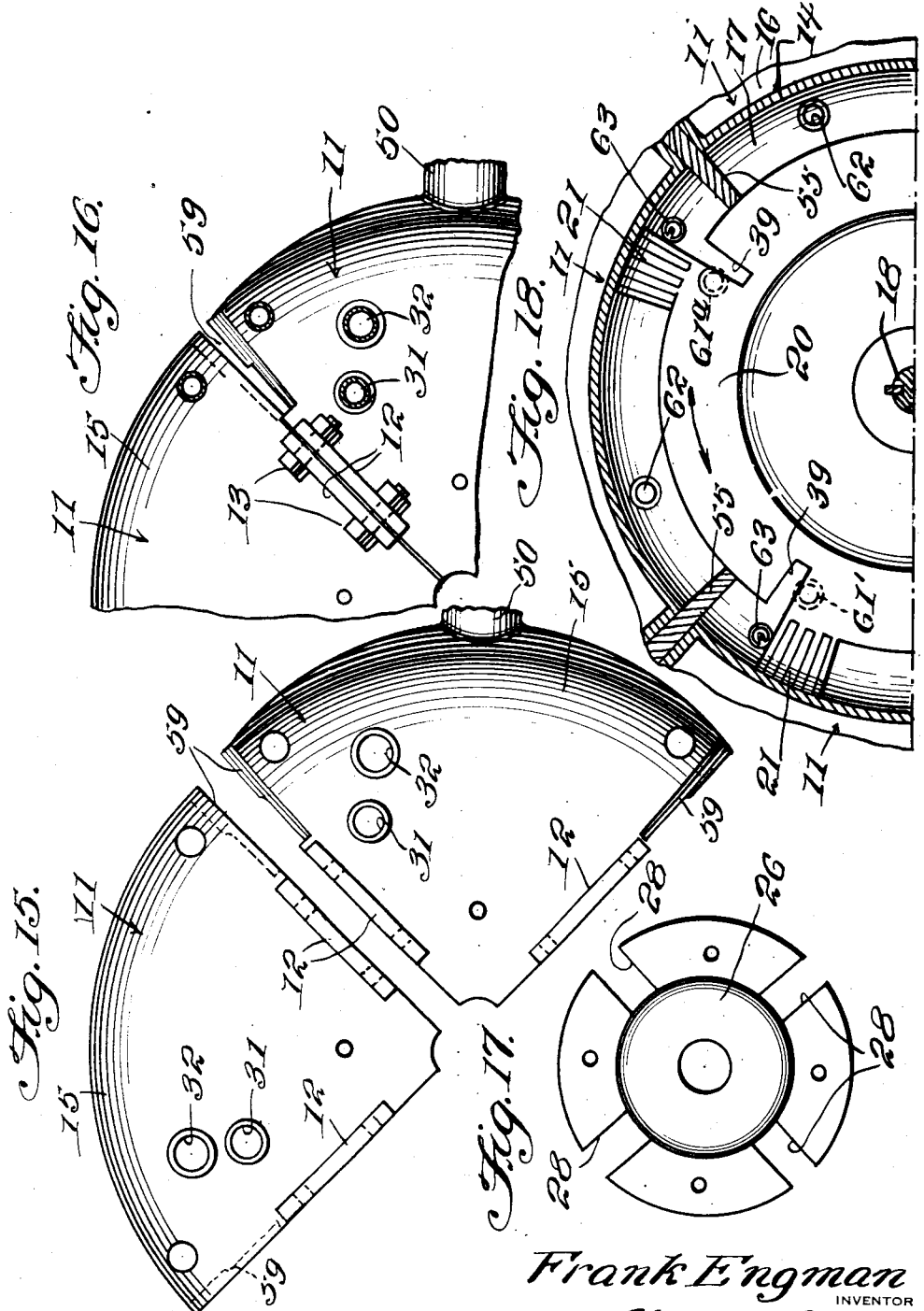

Patented May 14, 1929.

1,713,378

UNITED STATES PATENT OFFICE.

FRANK ENGMAN, OF MILWAUKEE, WISCONSIN.

ROTARY ENGINE.

Application filed November 18, 1926. Serial No. 149,197.

This invention relates to rotary engines, and contemplates a structure which embodies amongst other features, an annular combustion chamber adapted to be intermittently divided into a plurality of firing compartments in each of which a piston operates, an explosion taking place in the respective compartments, once for each quarter revolution of the rotor, thereby producing maximum power and efficiency.

In carrying out the invention I also contemplate a novel construction and arrangement of inlet and exhaust ports adapted to be selectively used, so that the rotor can be rotated in either direction, with a valve arrangement for simultaneously closing certain of the exhaust ports, depending of course upon the particular direction of rotation of the rotor.

Other objects and advantages will appear when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the engine.

Figure 2 is a sectional view on line 2—2 of Figure 1.

Figure 3 is a sectional view on line 3—3 of Figure 2.

Figure 4 is a sectional view through one of the valves controlling one of the exhaust ports above mentioned.

Figure 5 is a similar view through a two-way valve arranged in the intake manifold.

Figure 6 is a fragmentary sectional view showing one position of the piston just prior to the explosion of the fuel.

Figure 7 is an end view of one of the rotatable members carrying the partitions utilized to intermittently divide the combustion chamber into a plurality of compartments.

Figure 8 is a fragmentary sectional view showing how the partitions on the other rotatable member move in an opposite direction to those illustrated in Figure 7.

Figure 9 is a fragmentary sectional view somewhat similar to Figure 7 showing how the partitions pass through the combustion chamber for the purpose above stated.

Figure 10 is a fragmentary sectional view showing two different positions of one of the pistons.

Figure 11 is a view similar to Figure 9 showing a different position of the partitions carried by the rotatable member.

Figure 12 is a view in elevation showing the configuration of the partitions and the passage through which they move in the engine casing.

Figure 13 is a view taken on line 13—13 of Figure 6 showing two of the ports formed in the rotor and the manner in which they communicate with the intake manifold.

Figure 14 is a sectional view on line 14—14 of Figure 6.

Figure 15 is a view of a part of the engine casing showing the sections separated.

Figure 16 is a view showing how these sections are connected together.

Figure 17 is a view of the housing for the bearings for the rotor shaft.

Figure 18 is a fragmentary view of a modified construction.

Referring to the drawings in detail 10 represents a base upon which the engine is mounted, the latter including a casing made up of a plurality of segments 11 indicated in Figures 15 and 16. These sections have their adjacent edges formed with flanges 12 which are bolted or otherwise suitably secured together as at 13 in Figure 16. As shown in Figure 2 each segment includes spaced inner and outer walls 14 and 15 respectively, the intervening space defining a water jacket indicated at 16. The casing is of the cross sectional contour clearly illustrated in this figure, the inner wall defining a combustion chamber 17. Arranged within the casing transversely thereof is a shaft 18 which is journaled in suitable bearings 19, and which shaft has keyed or otherwise secured thereto a rotor 20. The rotor carries on the periphery thereof a plurality of equidistantly spaced pistons 21, preferably of the outline shown in Figure 14, each piston being equipped with packing rings or the like 22 to engage the wall 22 of the combustion chamber 17. It will be further noted upon inspection of Figure 3 that each segment 11 of the engine casing is closed at its ends as at 24 to provide for the proper circulation of water through the engine, while a space is provided between these adjacent sections to permit the partitions to pass therebetween with a view of intermittently dividing the combustion chamber into a plurality of firing compartments in a manner to be hereinafter more fully described. The shaft 18 of the rotor also operates between suitable bearings 25 arranged at the opposite sides of the casing as illustrated in Figure 2, which bearings are arranged in suitable housings 26. Each of these housings is preferably constructed in the manner illustrated in Figure 17, being slotted as at 28 to receive the flanges 12 of the casing sections. After the sections have been connected together in the manner above described, water is circulated through the water jacket by a pump or the like, the water inlet pipe being indicated at 29 in Figure 1, which introduces the water into one of the sections 11 of the casing. In order that the water may circulate through all of said sections, communication between the adjacent sections is established by a substantially U-shaped pipe 30, also shown in Figure 1, the water passing from one section of the casing to the other through each of these pipes 30.

In the preferred embodiment of the invention illustrated more specifically in Figures 1 to 3 inclusive, I provide an arrangement of inlet and exhaust ports, and a particularly constructed intake and exhaust manifold, so that the rotor can be operated in either direction. In other words each section 11 of the casing is provided with an inlet port and an outlet port on each side thereof, the inlet ports on one side being indicated at 31 and the exhaust ports at 32, while the inlet ports on the opposite side of the casing are indicated at 33 and the exhaust ports at 34. An intake manifold indicated generally at 35 is arranged above the engine casing, and includes substantially Y-shaped branches arranged at each side of the casing as clearly shown in Figure 1. The limbs 36 of one of these Y's communicate with the inlet ports 31 of the adjacent sections of the rotor casing, while projecting laterally from the branch of the Y are auxiliary branches 37 which communicate with the inlet ports of the remaining two sections of the casing. Fuel is introduced into the casing from one or the other side thereof depending upon the desired direction of rotation of the rotor 20, and consequently the intake manifold is provided with a two-way valve 38, so that fuel can be admitted into either one or the other of the Y-shaped branches. It might here be stated that the rotor 20 is provided with inlet ports 39 and 40 respectively and through which the fuel is admitted to the combustion chamber 17 at the proper time incident to the operation of the rotor. As shown in Figure 13 the port 39 opens at one side of the rotor for cooperation with one of the Y-shaped branches of the intake manifold, while the port 40 opens at the other side of the rotor for cooperation with the other Y-shaped branch of the intake manifold. It is of course to be understood that the rotor 20 is provided with this arrangement of ports 39 and 40 for each of the pistons carried by the rotor.

The exhaust manifold is constructed identically in the same manner as the intake manifold, there being a substantially Y-shaped branch or portion arranged on each side of the casing, the limbs of one of the branches being clearly illustrated in Figure 1 and indicated at 41. These branches communicate with the exhaust ports 32 of two of the casing sections 11, while the laterally disposed branches 42 of the exhaust manifold communicate with the exhaust ports 32 of the remaining two sections of the casing. In order to rotate the rotor in one direction it is necessary to close communication between the exhaust ports and the respective sections of the casing at one side thereof, this being necessary when the rotor is turning in a forward direction. Consequently the limbs 41 and the branches 42 of the exhaust manifold at one side of the casing are provided with valves 43 which may be of any suitable construction and clearly indicated in Figure 4. These valves 43 are connected in pairs by parallel arms 44, while the arms in turn are connected by a cross handle 45 so that all of the valves 43 can be simultaneously opened or closed as the occasion may require.

As hereinabove stated, it is my purpose to intermittently divide the circular combustion chamber 17 into a plurality of firing compartments, so that all of the pistons are simultaneously fired for each quarter revolution of the rotor, and for this purpose I make use of the semispherical-shaped members 46 and 47 respectively, which as clearly shown in Figure 2 are arranged at the opposite sides of the rotor casing. Each of these members include a hub-like portion 48 which supports the member for rotation upon suitable bearings 49 which are arranged about an extension 50 projecting from the adjacent side of the rotor casing as clearly shown in Figure 3. The extension is provided with a rectangular member 51 which is keyed or otherwise suitably secured to the extension and about which is arranged a clamp 52, through the instrumentality of which the rotor casing is clamped to the base or support 10. Each of the rotatable members 46 and 47 is provided with a ring gear 53 which meshes with a ring gear 54 keyed or otherwise suitably secured to the rotor shaft 18, and consequently the semispherical-shaped members 46 and 47 are rotated in opposite directions. However, each of the ring gears are of the same ratio as the gear 54, so that the rotatable members 46 and 47 make one complete revolution with each revolution of the rotor 20.

Each of the semispherical rotatable members carries a plurality of partitions, one for each piston 21, but the partitions of the respective members 46 and 47 are used conjointly in dividing the combustion chamber 17 into explosive compartments. I have herein illustrated each rotatable member above mentioned with four of these partitions, this structure being clearly shown in Figure 7 wherein the partitions of the member 46 are indicated at 55, 56, 57 and 58. These partitions are adapted to consecutively pass through the space 59 provided between each adjacent pair of casing sections 11, and as this passage is curved as shown in Figure 12, each partition is correspondingly curved to be used in the manner contemplated. In Figures 7 to 11 inclusive is illustrated the manner in which these partitions are used, wherein it will be noted that as the piston 21 moves past the adjacent inlet port 31 of the casing, the adjacent rotatable member 46 is timed so that one of the partitions carried thereby enters the combustion chamber 17 to form a wall against which the operating fluid expands. At the same time, the corresponding partition of the member 47 also enters the combustion chamber 17 as clearly shown in Figure 6, thereby dividing the chamber into an explosive compartment through which the piston 21 travels. Each of these compartments is provided with a spark plug 60 to ignite the charge of fuel at the proper time, thereby forcibly driving the piston 21 in the direction of the arrow indicated in Figure 6. As the piston moves in the direction just mentioned, it passes the exhaust port 32 in this particular side of the motor, thereby allowing the burnt gases to exhaust in the usual manner. Just subsequent to the explosion of the operating fluid in each and every explosive compartment, defined by the intervening space between the partitions above mentioned, the latter pass out of the combustion chamber 17 to allow free and unobstructed movement of the piston during its continued rotation. However, just as each piston passes the exhaust port, the rotatable members 46 and 47 are so timed as to bring the next partition carried thereby into position in the combustion chamber directly behind the piston which is moved from one section to the other, whereupon the partitions occupy a position for a second operation incident to the admission and explosion of the fuel within the chamber. In Figure 9 I have shown one of the partitions 55 just leaving the combustion chamber 17, while in Figure 10 I have shown by dotted lines the position of the piston 21 during its travel through the combustion chamber incident to the explosion which has just previously taken place. In Figure 10 I have also illustrated by full lines the position of the same piston as it enters the next section of the engine casing, and the next partition 56 shown in Figure 9 then occupying a position within the combustion chamber for the purpose above mentioned. In this manner I provide for the explosion of the fuel for each of the pistons every quarter of a revolution of the rotor 20, or sixteen explosions for each complete revolution of the rotor. As above stated the rotatable members 46 and 47 are geared to the rotor in a manner to make one complete revolution with each revolution of the rotor, so that the partitions carried by these rotatable members will enter and leave the piston chamber at the proper time for the contemplated operation. In Figure 8 I have shown by the arrow 61' how the partitions of the rotatable member 47 move in an opposite direction to the partitions carried by the rotatable member 46 in Figure 7.

In Figure 18 I have shown a modified construction of the invention, which differs from the construction hereinabove described in that the rotor is only intended to turn in a forward direction as indicated by the arrow. The rotor 20 is provided with pistons 21 in the same manner as above described, but inasmuch as the rotor is only intended to turn in one direction, the combustion chamber is only provided with a single fuel inlet 61ª and an exhaust port 62. The spark plug is indicated at 63. Otherwise the operation of the invention is the same as hereinabove set forth.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:—

A rotary engine comprising a casing including a plurality of segmental sections, each section being substantially U-shaped in cross section and including spaced inner and outer walls to define a combustion chamber open at both ends of the sections and a water jacket closed at both ends, flanges projecting from each end of each section, means connecting said flanges together with the sections arranged in casing like formation, the adjacent ends of the respective sections being slightly spaced apart, a rotor operated within the casing and including a plurality of equidistantly spaced pistons movable through the combustion chambers of the respective sections, inlet and exhaust manifolds, semi-spherical shaped members arranged exteriorly of the casing and rotatable in planes parallel with the rotor shaft, a gear supported by each of said members, a main gear mounted on the rotor shaft and meshing with the aforementioned gears to rotate said members in opposite directions, a plurality of spaced partitions projecting obliquely from each of said members and adapted to singly pass through the spaces between the respective sections of the casing and thus provide a firing compartment for the respective pistons, and means establishing communication between the combustion chamber of each section and the exhaust inlet and exhaust manifold.

In testimony whereof I affix my signature.

FRANK ENGMAN.